US008421613B2

(12) United States Patent
Navarro et al.

(10) Patent No.: US 8,421,613 B2
(45) Date of Patent: Apr. 16, 2013

(54) AUTO FLUID CONDITION ALERT

(75) Inventors: Diego Navarro, Bettendorf, IA (US); Edward John Hermsen, Platteville, WI (US)

(73) Assignee: Deere & Company, Moline, IL (US)

( * ) Notice: Subject to any disclaimer, the term of this patent is extended or adjusted under 35 U.S.C. 154(b) by 216 days.

(21) Appl. No.: 11/389,926

(22) Filed: Mar. 27, 2006

(65) Prior Publication Data

US 2007/0222573 A1 Sep. 27, 2007

(51) Int. Cl.
*B60Q 1/00* (2006.01)

(52) U.S. Cl.
USPC ....... 340/457.4; 73/53.05; 73/61.71; 324/698

(58) Field of Classification Search ............... 340/457.4, 340/450.3; 73/53.05, 53.07, 61.71; 701/29, 701/30; 324/698
See application file for complete search history.

(56) References Cited

U.S. PATENT DOCUMENTS 3,952,580 A * 4/1976 Bennett ........................ 73/61.71
4,126,038 A 11/1978 Bartlett et al.
4,181,009 A * 1/1980 Williamson ................. 73/61.71
4,706,193 A * 11/1987 Imajo et al. ..................... 701/30
5,001,424 A * 3/1991 Kellett et al. ................ 73/53.07
5,064,530 A * 11/1991 Duff et al. .................... 73/53.07
5,817,928 A * 10/1998 Garvey, III et al. .......... 73/53.05
6,151,108 A 11/2000 Kwon et al.
6,278,281 B1 8/2001 Bauer et al.
6,327,900 B1 12/2001 Mc Donald et al.
6,513,368 B2 * 2/2003 Bondarowicz et al. ...... 73/53.05
6,580,366 B1 * 6/2003 Engfehr ..................... 340/457.4
6,788,072 B2 * 9/2004 Nagy et al. ................... 73/53.07
6,810,718 B2 * 11/2004 Wilson et al. ................ 73/53.05
6,859,517 B2 * 2/2005 Wilson et al. .................. 378/47
6,966,994 B2 * 11/2005 Berns et al. .................. 73/53.07
7,266,472 B2 * 9/2007 Neumann et al. ............... 701/30
2002/0133274 A1 * 9/2002 Kubo et al. ...................... 701/30
2005/0062596 A1 * 3/2005 Gornick ..................... 340/457.4

* cited by examiner

*Primary Examiner* — John A Tweel, Jr.
(74) *Attorney, Agent, or Firm* — Michael A. Essien; Fondungallah, Kigham & Eissen, LLC

(57) ABSTRACT

A method and device for determining the appropriate time to recharge hydraulic fluid in a work vehicle. The method preferably includes making a real time determination of the at least a quality parameter of hydraulic fluid in a work vehicle. The system includes comparing in real time, the quality parameter to a predetermined value for the hydraulic fluid. The method of the present invention also includes a system for comparing the determined values and communicating same to an operator. The method of the present invention also includes the capacity to control the output level of the work vehicle according to the level of contamination in the hydraulic fluid. The present invention also provides a device for real time monitoring and control of the hydraulic fluid.

14 Claims, 2 Drawing Sheets

AUTO FLUID CONDITION ALERT

BACKGROUND

Work vehicles such as farm tractors, harvesters, earthmovers, and the like utilize hydraulics in their customary heavy-duty operations. The properties of these hydraulics and the fluids used therein are constantly changing when the equipments are in operation. Operators of these work vehicles have long desired to have the capacity to continually monitor the condition of the fluids used in their equipments. In many common situations, it is challenging to ascertain the optimal time or opportunity to recharge the fluids, except in cases where such fluids are clearly and noticeably in poor condition. "Recharge" in this disclosure implies, without limitation, any act or process to replenish, drain and refill, or add additives to a hydraulic fluid container in a work vehicle for the purpose of returning the fluid level to a required and prescribed level for efficient operation. Such conditions may become noticeable or obvious after prolonged use of the equipment, at which time; the fluid would have lost its effectiveness to function as intended and unintended wear would have occurred. These challenges present at least two extremes in the management of work vehicles. At one extreme, an operator may rush to recharge the fluids before the appropriate time to do so, needlessly increasing expenses. At the other extreme, an operator may not recharge the fluids unless prompted by some equipment failure or damage. Further, hydraulic fluids pose an especially increasing challenge, given that the work vehicles are often used in rugged environments and monitoring is not usually easy to accomplish. Also, it may take several hours to complete an analysis needed for decision-making. Such duration is not sensitive to the time constraints implicit in the maintenance of equipments in good working condition. Manufacturers of work vehicles also typically include a recommended maintenance schedule that may include when to change the fluid in a vehicle. Sometimes, it is imperative to keep close to these schedules in order to maintain the warranties that may come with the equipment purchase.

Accordingly, there is a need among operators and manufacturers of work vehicles to determine the appropriate opportunity for a fluid change in their equipments, and to enjoy the benefits accruable from such care of the equipments. Such a system is disclosed in the present invention.

SUMMARY

The present invention provides a method and device for determining an optimal time to recharge hydraulic fluid in a work vehicle. The method includes making a real time determination of at least a quality parameter of the hydraulic fluid in the work vehicle. The quality parameters of interest preferably include particle count of the hydraulic fluid. The method of the present invention also provides comparison, in real time, of the quality parameter with a predetermined reference value for the hydraulic fluid, using such comparative values to determine the optimal time for a recharge of the hydraulic fluid in the work vehicle. The method of the invention also includes alerting an operator of the optimal time to recharge the hydraulic fluid; managing the output capacity of the vehicle according to the quality of the hydraulic fluid; and resetting to a new initial quality point of reference for the hydraulic fluid in the vehicle after the fluid recharge. In some instances, the method of the present invention also includes the capacity to disable the vehicle before conditions deteriorate to such an extent that a catastrophic event occurs due to the condition of the hydraulic fluid in the work vehicle.

The present invention also provides an apparatus for determining the optimal time for a fluid recharge in a work vehicle. The apparatus of the present invention includes at least a sensor for determining in real time, a quality parameter of the fluid, comparing the quality parameter to a predetermined value for the quality parameter, and determining in real time, if the measured quality parameter demands a recharge of the fluid in the work vehicle. As used herein, catastrophic failure implies a breakdown of the work vehicle due to lack of hydraulic fluid in an engine compartment, the fluid in poor operating condition, or other preventable conditions.

The alert system provided by the method of the present invention may be utilized to reduce warranty expenses in a work vehicle when such system is employed as an early detection system for equipments as operators are alerted and in some cases forced to replenish or recharge the fluid system in an equipment before catastrophic events happen or before the equipment loses capacity to perform effectively. Effectively, this decreases expenses for such preventable breakdowns and increases uptime for the vehicle.

DETAILED DESCRIPTION

Figure 1:
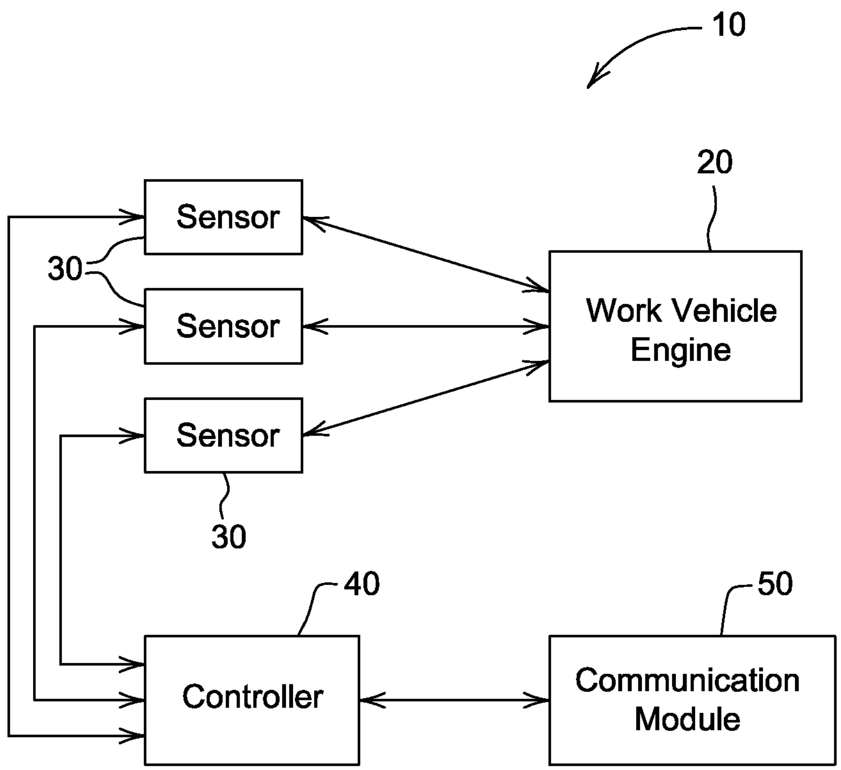
FIG. 1 is a schematic illustration of an automatic fluid condition monitoring system according to the present invention.

Referring to FIG. 1, the block diagram illustrates a schematic of an embodiment of the present invention showing a system 10 for determining the optimal time or opportunity to recharge hydraulic fluid in a work vehicle. The system 10 preferably includes a sensor or sensors 30 operably associated or connected to a work vehicle engine 20 and a controller 40. The controller 40 is operably or integrally connected to a communicator or communication system 50. As is typical with work engines, when the system is powered on, the hydraulic system is expected to be simultaneously powered on. The real time monitoring of the hydraulic fluid system is preferably initialized when the system is powered on and continues until the system is turned off.

The sensor 30 of the present invention preferably includes probes, transmitters or other suitable sensing instruments as are known in the art. The sensor 30 is preferably useful for determining quality parameters in the hydraulic fluid. It is reasonable to expect at least a communication device between sensor 30 and the work vehicle engine 20 to facilitate the sensing and transmission of the quality parameters of interest. The controller 40 is preferably suitable to receive the quality parameters information from the sensor 30 for further transmission to the communicator 50. The communicator 50 may be used to transmit information to the sensor 30 via the controller 40.

Figure 2:
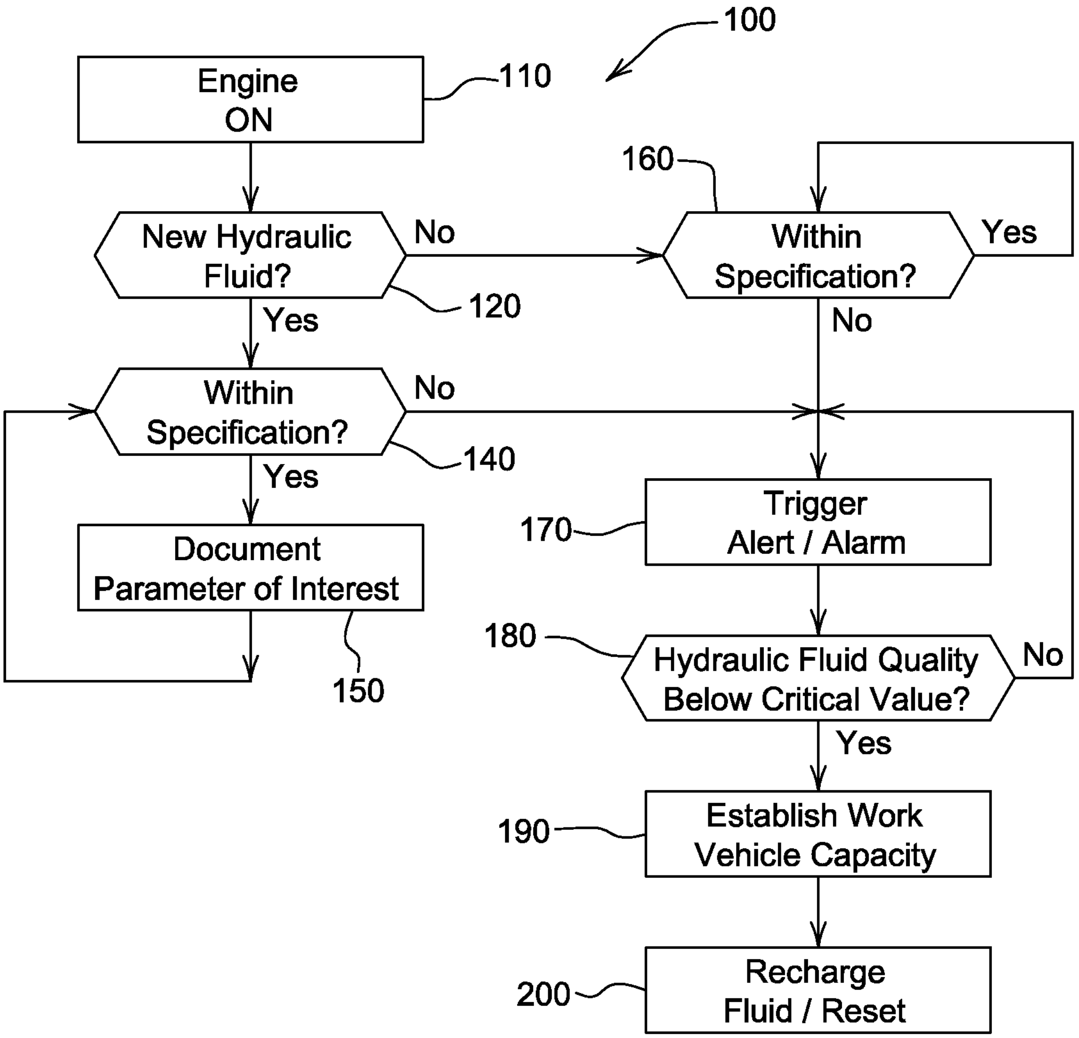
FIG. 2 is a flow chart illustrating the process of real time monitoring of a hydraulic fluid condition according to the present invention.

FIG. 2 is a flow chart of an embodiment of the present invention illustrating the fluid condition monitoring system. Further incorporating FIG. 1, as the quality parameters of the fluid in the present invention are determined in real time, it is expected that the determination will be carried out when the work vehicle engine is in operation. As an illustration of the present invention, the sensor 30 in FIG. 1 is preferably activated when the work vehicle engine is in operation in step

110. The sensor 30 preferably establishes when the work vehicle engine's hydraulic fluid container is charged with new hydraulic fluid in step 120. This step may be accomplished by determining at least a quality parameter of interest or by recognition of a reset status in the sensor or controller. Further, at least a quality parameter of interest may be evaluated for their acceptability in step 160. This evaluation may be accomplished by comparing the quality parameter(s) of interest with the hydraulic fluid specification for such work vehicle. The hydraulic fluid specification for the work vehicle of interest may be input into the controller 40 as a quality point of reference R. As an example, work vehicle manufacturers such as John Deere of Illinois, have preferred conditions for the hydraulic fluids in their vehicles to ensure optimal performance.

When the sensors determine the presence of new or recharged hydraulic fluid in the work vehicle, a determination of a quality parameter of interest may then be accomplished in step 140. As indicated in the flow diagram, if the quality parameter of interest is outside the specification for such work vehicle, when compared to the quality point of reference R, an alert is preferably transmitted to the controller 40. If the parameters of interest are still acceptable or within the specification, the operation of the work vehicle continues without need to communicate an alert to the system. The method of the present invention preferably includes a recording means 150 wherein a pertinent data stamp of the hydraulic fluid quality may be obtained and maintained. The system of the present invention may include a recordation capacity via a communicator 50 for recording the parameters of interest and optionally transmitting same to a subsequent location or interface. The monitoring preferably continues until a variance in the quality parameter of interest is noted, as illustrated in the flow diagram 100.

If in the primary, it is determined that the hydraulic fluid in the hydraulic fluid container is not new or recharged, the next step 160 is preferably a determination of the quality parameters of interest. If the parameter or parameters are outside the specification R for the work vehicle, an alert is communicated as shown in step 170. As discussed above, the alert system of the present invention may include a communication means 50.

When the alert system 170 is activated due to the recognized variance in the quality parameter of interest, a further determination may be accomplished as noted in step 180 for values that are either outside the specification or critical. A parameter is deemed critical when or if continued deterioration of the parameter may cause substantial damage to the work vehicle. When the quality parameter of interest is deemed critical, a power output control system as noted in step 190 may be activated. This power control system 190 may progressively manage (by reducing or diminishing) the output capacity of the work vehicle engine, thus preventing a catastrophic failure due to need for a recharge of hydraulic fluid. As disclosed above, this need may arise from the poor quality of the hydraulic fluid, or absence of such fluid in the work vehicle engine. The power control system may disable the work vehicle if deemed appropriate to prevent damage. It is conceivable, or preferable that the power control system step 190 be accomplished electronically or remotely. By remotely it is meant that components for effective decision making are preferably encoded into the controller 40 and transmitted to a remote location (not shown). In some instances, it is conceivable that the remote location may include the capacity to manage the level of power output allowable for the work vehicle. At the conclusion of this fluid recharge process, the monitors or sensors in the work vehicle may be reset at each as shown in step 200.

As disclosed above, the quality parameters of interest for the work vehicle may include particle count, viscosity, water saturation and oxidation, and temperature of the hydraulic fluid in the work vehicle. Particle count is used herein to imply the measurement of all particles that have accumulated within the hydraulic system, including those metallic and non-metallic, fibers, dirt, water, bacteria and any other kind of debris. The particle count, as used in the present invention is deemed useful in determining fluid and system cleanliness in the hydraulic fluid in the work vehicle. The particle count of the hydraulic fluid may be determined by other methods known in the art, including pore blockage sensors, infrared light particle detector, or laser particle counters. Typical particle count detectors used in the present invention include the Super Caddy series available from John Deere Company of Illinois. The particle count detector is preferably incorporated into the hydraulic system at strategic locations such as along fluid lines with results transmitted to an instrument control panel or controller for operator's use. The present invention utilizes particle count as the primary quality reference in determining the optimal time for a recharge of the hydraulic fluid in the system. Other quality parameters such as, viscosity, humidity, oxidation number, or total acid number may be useful in verifying or corroborating the particle count detector determination. Humidity sensors may be incorporated to measure the water saturation level and temperatures in the hydraulic fluid system. It is conceivable that other parameters may be deemed primary or secondary depending on equipments or other factors. The use of particle count as a quality parameter in this disclosure is not meant as a limitation or exclusion of other properties usable to determine the quality of a fluid in a system.

The system of the present invention preferably is adapted for continuous monitoring of the hydraulic fluid when the system is in operation and automatically and continuously transmits the equipment's hydraulic fluid condition to the operator via an instrument panel, holographic, wireless or other suitable communication modes as appropriate or necessary or according to the set up in the particular embodiment.

The step of notifying the operator preferably includes a fault code alert. The fault code alert may include different levels of warnings that may be elevated, including the capacity to remotely disable the equipment when needed. A need may arise if no action is taken before an anticipated catastrophic failure of the equipment due to poor hydraulic fluid quality, including absence of hydraulic fluid in the equipment.

A benefit of the present invention includes the capacity to communicate with a third party, wherein the quality parameters of the work vehicle are continually monitored for continuous improvement, equipment maintenance, staff control, or any other use. The present invention also provides operators and manufacturers an opportunity to minimize equipment failures and breakdowns due to preventable causes such as poor hydraulic fluid conditions, including lack of such fluids in the equipment. As an early detection system, the present invention provides operators and manufacturers opportunities to enhance the uptime of their equipments and reduce operating cost attributable to these conditions.

Having thus illustrated the embodiments of the present invention, those of skill in the art will readily appreciate that the teachings found herein may be applied to yet other embodiments.

The invention claimed is:

1. A method for determining an optimal time to recharge hydraulic fluid in a work vehicle, the method comprising:

making a real time determination of at least a quality parameter of the hydraulic fluid in the work vehicle, wherein the quality parameter includes particle count;

comparing, in real time, the at least a quality parameter of the hydraulic fluid with a predetermined value for the hydraulic fluid;

determining in real time, from the comparative value of the at least a quality parameter, the optimal time for a recharge of the hydraulic fluid in the work vehicle; and alerting an operator of the work vehicle of the opportunity to recharge the hydraulic fluid in the work vehicle, wherein the alerting includes using an escalated alarm system for stepwise reduction in the work vehicle efficiency according to the degree of contamination of the hydraulic fluid.

2. The method of claim 1, wherein the alerting of the operator includes controlling the power output efficiency of the work vehicle.

3. The method of claim 2, wherein controlling the power output is associated with the degree of contamination of the hydraulic fluid.

4. The method of claim 1, wherein the quality parameters include viscosity, humidity, oxidation level, or combinations thereof the hydraulic fluid.

5. The method of claim 1, wherein the alerting of the operator is alerted via wireless transmission.

6. The method of claim 1, wherein the alerting of the operator includes use of an alarm and holographic messaging.

7. The method of claim 1, wherein an operator can remotely disable the work vehicle.

8. A method for determining an optimal time to recharge hydraulic fluid in a work vehicle, the method comprising:

making a real time determination of at least a quality parameter of the hydraulic fluid in the work vehicle, wherein the quality parameter includes particle count;

comparing, in real time, the at least a quality parameter of the hydraulic fluid with a predetermined value for the hydraulic fluid;

determining in real time from the comparative value of the at least a quality parameter, the optimal time for a recharge of the hydraulic fluid in the work vehicle: and alerting an operator of the work vehicle of the opportunity to recharge the hydraulic fluid in the work vehicle, wherein the alerting includes using an escalated alarm system for stepwise reduction in the work vehicle efficiency according to the degree of contamination of the hydraulic fluid and resetting the quality parameter to a new initial quality point of reference for the hydraulic fluid in the work vehicle after the fluid recharge.

9. An apparatus for determining an optimal time to recharge the hydraulic fluid in a work vehicle, comprising:

at least a real time monitor or sensor;

at least a communication device, wherein the communication device is adaptable to communicate in real time between the sensor and an operator of the work vehicle; and an alert system capable of alerting the operator of an optimal time for a recharge, wherein said alert system is adaptable to manage the output of the work vehicle depending on contamination level and wherein the alert system includes an escalated alarm system for stepwise reduction in the work vehicle efficiency according to the degree of contamination of the hydraulic fluid and resetting the quality parameter to a new initial quality point of reference for the hydraulic fluid in the work vehicle after the fluid recharge.

10. The apparatus of claim 9, wherein the sensor is adaptable for monitoring in real time, at least a quality parameter of the work vehicle.

11. The apparatus of claim 9 wherein the quality parameter includes particle count of the hydraulic fluid in the work vehicle.

12. The apparatus of claim 9 wherein the quality parameter includes viscosity, humidity, oxidation level, or combinations thereof.

13. The apparatus of claim 9, wherein the alert system is a fault code alert system.

14. The apparatus of claim 9, wherein the real time monitoring system includes notification of the operator via an instrument panel, holographic or wireless communication modes.

* * * * *